United States Patent
Koch et al.

(10) Patent No.: US 8,918,492 B2
(45) Date of Patent: Dec. 23, 2014

(54) FIELD PANEL WITH EMBEDDED WEBSERVER AND METHOD OF ACCESSING THE SAME

(75) Inventors: Udo Koch, Mount Prospect, IL (US); John Jeffers, Franklin, WI (US); Robert L. Kalafut, Downers Grove, IL (US); Margaret Scribo, Deerfield, IL (US); Lonnie Douglas Spears, Racine, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 19 days.

(21) Appl. No.: 13/284,249

(22) Filed: Oct. 28, 2011

(65) Prior Publication Data

US 2012/0110158 A1 May 3, 2012

Related U.S. Application Data

(60) Provisional application No. 61/408,451, filed on Oct. 29, 2010.

(51) Int. Cl.
*G06F 15/173* (2006.01)
*H04L 29/08* (2006.01)
*H04L 12/28* (2006.01)

(52) U.S. Cl.
CPC ............ *H04L 67/1095* (2013.01); *H04L 67/36* (2013.01); *H04L 12/2838* (2013.01); *H04L 12/2816* (2013.01); *H04L 67/12* (2013.01)
USPC ............ 709/223; 700/276; 700/277; 709/224

(58) Field of Classification Search
CPC .................. H04L 2012/2841; H04L 41/0806; H04L 12/2602; H04L 12/2809; H04L 12/2814; H04L 12/2829; H04L 12/2832; H04L 2012/285; H04L 41/22; H04L 43/00; H04L 43/045; H04L 51/32; H04L 67/025; Y02B 30/78
USPC ........................ 709/223, 224; 700/276, 277
See application file for complete search history.

(56) References Cited

U.S. PATENT DOCUMENTS

| | | | |
|---|---|---|---|
| 7,246,194 B2 * | 7/2007 | Train et al. | 710/311 |
| 8,023,440 B2 * | 9/2011 | Nass et al. | 370/310 |

(Continued)

FOREIGN PATENT DOCUMENTS

EP     1898281 A2     3/2008

OTHER PUBLICATIONS

PCT Search Report for PCT/US2011/058509, dated Jul. 5, 2012.

*Primary Examiner* — Douglas W Owens
*Assistant Examiner* — Monica C King (57) ABSTRACT

The systems, methods and devices disclosed herein provide for a field panel that includes a webserver. The field panel and webserver are arranged in communication with one or more automation components and/or field panels deployed for operation in connection with the building automation system. An information request may be directed to a master field panel for authorization. The master field panel may in turn query a node table containing address and/or communication information with the other field panels and/or automation components operable on the wired or wireless communication network. The information within the node table allows for direct communication to the other field panels and/or automation components operable on the network. In this way, authorized access to each of the field panels and/or automation components is achieved while any communications bottleneck at the master field panel may be significantly reduced or eliminated.

21 Claims, 6 Drawing Sheets

(56) References Cited

U.S. PATENT DOCUMENTS

| | | | |
|---|---|---|---|
| 8,350,691 B2* | 1/2013 | McFarland | 340/506 |
| 2003/0151513 A1* | 8/2003 | Herrmann et al. | 340/573.1 |
| 2004/0260812 A1* | 12/2004 | Rhodes et al. | 709/225 |
| 2005/0143863 A1* | 6/2005 | Ruane et al. | 700/276 |
| 2007/0123249 A1* | 5/2007 | Sun | 455/423 |
| 2007/0232288 A1* | 10/2007 | McFarland et al. | 455/423 |
| 2008/0140870 A1* | 6/2008 | Meyer et al. | 710/10 |
| 2009/0083416 A1* | 3/2009 | Nass et al. | 709/224 |
| 2009/0177298 A1 | 7/2009 | McFarland | |
| 2009/0245151 A1* | 10/2009 | Augustin et al. | 370/311 |

* cited by examiner

FIELD PANEL WITH EMBEDDED WEBSERVER AND METHOD OF ACCESSING THE SAME

PRIORITY INFORMATION

This patent document claims priority under 35 U.S.C. §119 (e) to U.S. Provisional Patent Application No. 61/408,451, titled "FIELD PANEL WITH EMBEDDED WEBSERVER AND METHOD OF ACCESSING THE SAME", filed on Oct. 29, 2010, the content of which is hereby incorporated by reference to the extent permitted by law.

TECHNICAL FIELD

This patent document is generally directed to building automation systems and automation components for use therein. In particular, this patent document is directed to a field panel or other automation component configured to include an embedded webserver to facilitate communications, maintenance and control.

BACKGROUND

Conventional building automation systems are typically configured and arranged in a hierarchical fashion that includes a plurality of automation components in communication with a field panel such as a field level network controller. The automation components may be temperature and/or humidity sensors, carbon dioxide sensors, carbon monoxide sensors, and emergency indicators, typically communicate with the field panel via a wired or wireless field level network according to proprietary or standard building communication protocols such as the BACnet protocol. Depending on the size and layout of the building in which the building automation system is deployed, multiple field panels may be utilized. In operation, each of the plurality of automation components may communicate sensor and/or status data to one or more predefined field panels for further analysis and/or utilization.

In some implementations of conventional building automation systems, a workstation may be in communication with one or more of the field panels to control and monitor the plurality of automation components distributed throughout the building. For example, the workstation may implement a control or automation application configured to communicate with the one or more field panels through a management level network (MLN) and/or a building level network (BLN). The automation application or control system implemented by the workstation provides analysis, configuration, monitoring and communication functionality. The workstation may be further configured to operate as a gateway or remote server to allow remote monitoring and access of the building automation system. In another conventional implementation of the building automation system, one or more of the field panels may be configured to operate as the gateway or remote server to allow the building automation system to be remotely monitored and/or accessed via, for example, the Internet. An exemplary field panel such as an APOGEE® Controller provided by Siemens Industry Inc., Building Technologies Division ("Siemens"), may be configured to operate as a master or central field panel to provide remote access or viewing of the building automation system.

In one implementation of the conventional building automation system discussed above, sensor and/or status data as well as any configurable parameters relating specifically to each of the plurality of automation components may be accessible through the master or central field panel. For example, a user may attempt to access the configuration and/or sensor data from one of the plurality of components in communication with one of the field panels deployed within the building by sending an information request to an interface provided by the master or central field panel, which, in turn, communicates with the field panel of interest. Thus, the master or central field panel acts as a clearinghouse to centrally process and handle information generated and provided by each of the plurality of automation components. The master or central field panel aggregates or otherwise collects all requested information a single location.

It would be desirable to provide a building automation system, hardware and communications configuration that provides flexibility and avoids information bottlenecks.

SUMMARY

The systems, methods and devices disclosed and discussed herein are directed to a building automation control system incorporating a field panel with an integral webserver. The exemplary field panel and webserver may be arranged in communication with one or more automation components and/or field panels deployed for operation in connection with the building automation system. For example, an initial information request may be directed to a designated field panel for authorization and the field panel may, in turn, query a node table. The node table stores address and communication information identifying the other field panels and/or automation components operable on the wired or wireless communication network. The stored information may be continually and/or periodically updated as changes in the information are detected. The information within the node table may, in turn, allow for direct and authenticated communication to the other field panels and/or automation components operable on the network without routing the communication through the designated field panel. In this way, authorized access to each of the field panels and/or automation components may be achieved while the possibility of a communications bottleneck at a master or central field panel may be significantly reduced and/or eliminated.

In one embodiment, a building automation system is disclosed. The building automation system includes a client portal in communication with a network, a first field panel in communication with the network and the client portal. The first field panel includes a first webserver, and a first node table, wherein the first node table contains address information related to the configuration of the first field panel. The building automation system further includes a second field panel in communication with the first field panel, the second field panel including a second node table in communication with the first node table, wherein the second node table contains address information related to the configuration of the second field panel, and wherein the first and second node tables are synchronized to generate an updated node table based on received address information from the second node table and address information from the first node table and wherein, in response to a communication request originating at the client portal, the updated node table is provided to the client portal by the first webserver.

In another embodiment, a building automation system is disclosed. The building automation system includes a network, a viewer application implemented on a client portal in communication with the network, and a first field panel in communication with the network such that the first field panel includes is a first webserver and a first node table, and where the first field panel is configured to receive a communication request originating from the viewer application. The building automation system further includes a second field panel in communication with the first field panel via the network such that the second field panel includes a second node table in communication with the first node table, where, the first node table synchronizes with the second node table to update both node tables, and where the updated note tables contains address information from the first node table and the second node table prior to synchronization and wherein the synchronized first node table is provided to the viewer application by the first webserver.

In another embodiment, a method for communicating with one or more field panels operable within a building automation system is disclosed. The method includes receiving a communications request at a first field panel storing a first node table, wherein the communications request originates at a client portal, communicating, in response to the received communications request, a viewer application to the user terminal for implementation thereon, synchronizing the first node table to a second node table stored in a second field panel in communication with the first field, wherein the synchronized first and second node table define an updated node table, communicating, in response to the received communication request, the updated node table to the viewer application, and receiving a second communication request at the second field panel from based on address information contained within the updated node table.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

The systems, methods and devices disclosed and discussed herein relate to, in general terms, an automation component such as field panel that incorporates a webserver to facilitate control, configuration and monitoring of an exemplary building automation system. In one exemplary embodiment, the webserver may be a BACnet-compatible webserver employing or utilizing data exchange services implementing Control Systems Modeling Language ("CSML") standard to (among other services) map data from a field level network implementing BACnet protocols to a management level network implementing Ethernet or TCP/IP protocols. In an alternate embodiment, the webserver and associated data exchange services may be compatible with the LonTalk protocol and operable on a LON network. The automation component or field panel, may further be configured to store a user interface or viewer application. The user interface or viewer application may be a web compatible and deliverable application or applet configured to be implemented by a browser such as Microsoft's INTERNET EXPLORER and Apple's SAFARI. In another embodiment, the user interface or viewer application may be a standalone application deliverable upon request to the field panel.

The data exchange services may be based on any standard or protocol that facilitates communications between automation components and devices operable within the building automation system. In order to facilitate compatibility, the data exchange services may be implemented and configured to utilize simple HTTP messaging protocols. XML tags and structures may additionally be utilized to provide structure and information regarding the type and purpose of the one or more communicated messages.

The systems, methods and devices disclosed and discussed herein may further be configured and arranged in a scalable and expandable manner to allow for implementation with both new and existing building automation systems. Moreover, the systems, methods and devices disclosed and discussed herein may implement and integrate both wired and wireless technologies and protocols. For example, the building automation system may include a wired communication network configured according to an Ethernet protocol and coupled to a first wireless communications network configured according to the Wi-Fi (IEEE 802.11) standard and a second wireless communications network configured according to the Zigbee (IEEE 802.15.4) standard. In one embodiment, multiple field panels may be configured to communicate with via the wired communication network and the first wireless communications network; and each of the multiple field panels may, in turn, communicate with multiple devices, sensors, controllers and other automation components via the second wireless communications network.

Figure 1:
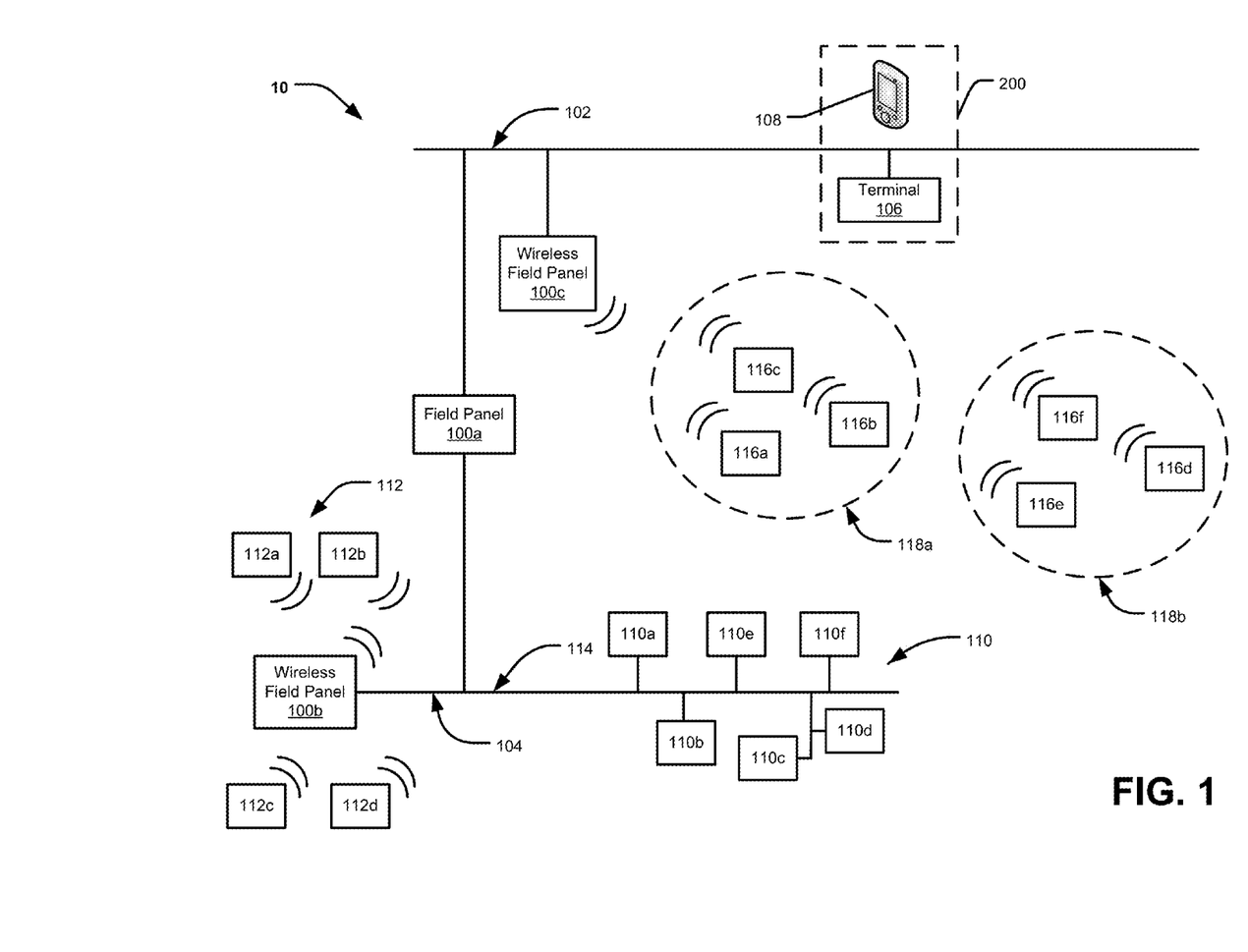
FIG. 1 illustrates an exemplary building automation system configured to facilitate communication in accordance with the inventive concepts disclosed herein.

FIG. 1 illustrates an exemplary building automation system or control system 10 that may incorporate the methods and implement the systems for access and communication disclosed herein. The control system 10 includes a first network 102 coupled to a second network 104 via automation components or field panels 100. The first network 102 may be an automation level network (ALN) or management level network (MLN) in communication with a client portal 200 (see FIG. 2). The client portal 200 generally represents any workstation or terminal 106, any portable device 108 or other automation component configured to access, monitor and communicate with the first and second networks 102 and 104. The control system 10, in this exemplary configuration, includes multiple field panels 100 (individually identified as field panels 100a to 100c) deployed throughout a building. Field panels 100 may be PXC Modular field panels provided by Siemens. In the illustrated embodiment, the field panel 100a is a programmable device that couples the automation level network represented by the first network 102 to a floor level network (FLN) represented by the second network 104. The field panels 100b and 100c are, in this example, wireless field panels and automation components configured to operate as a bridge between wired and wireless elements of the control system 10.

The second network 104, in this exemplary embodiment, may include a wired network 114 that connects to one or more wired automation components such as the building environmental control devices 110 (individually identified as automation components 110a to 110f) to the field panel 100a. The second network 104 may further be coupled to wireless building environmental control devices 112 (individually identified as devices 112a to 112d) through the wireless field panel 100b. The devices 110 and 112 may represent different groups of devices distributed within different areas or portions of a building. In another embodiment, the devices 110 and 112 may represent different types or classes of devices mixed or interspersed within the same area of portion of the building.

The control system 10 may further include automation components such as environmental control devices 116 (individually identified by the reference numerals 116a to 116f) grouped or arranged to establish wireless mesh networks or subnets 118a and 118b operable according to the ZigBee standard. In one embodiment, the devices 116a to 116f are automation components such as, for example, temperature sensors, damper actuators, odor dispensing devices and lighting controls. The devices 116 can be configured to wirelessly communicate information via the communication mesh established between each device and the wireless field panel 100c coupled to the network 102. In operation, the device 116a may communicate with other devices 116b and 116c within the mesh network 118a by sending a message addressed to the network identifier, alias and/or media access control (MAC) address assigned to each of the interconnected automation components 116a to 116f and/or to the access point the wireless field panel 100c.

The devices and automation components deployed in the mesh network 118b may be configured in a manner similar to the components of mesh network 118a. The mesh networks 118a and 118b may, in turn, represent different areas or portions within the building. Alternatively, the mesh networks 118a and 118b may represent different classes or types of automation components deployed within the same area or portion of the building.

Figure 2:
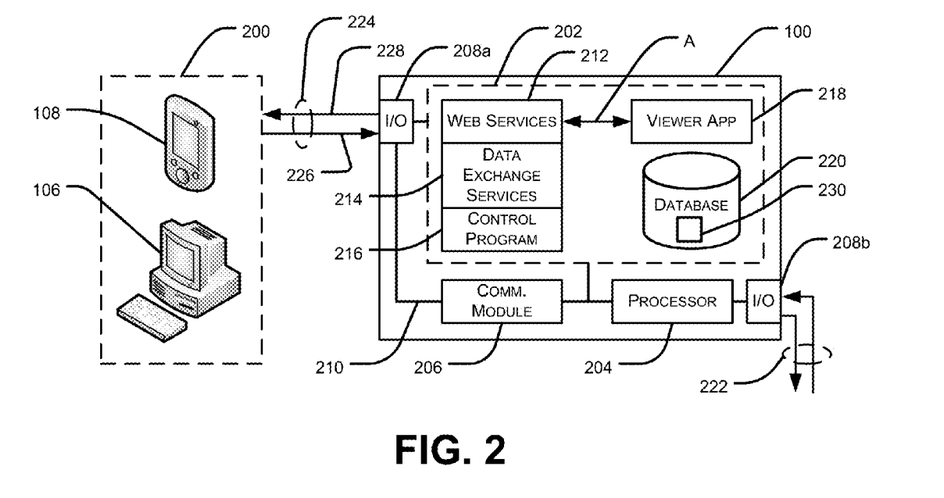
FIGS. 2 and 3 illustrate exemplary communications between a client portal and a field panel containing an embedded webserver in accordance with the inventive concepts disclosed herein.

FIG. 2 illustrates an exemplary embodiment of one of the field panels 100 configured in accordance with the inventive concepts disclosed herein to provide web-based conductivity to the client portal 200. The exemplary field panel 100 as shown in the present example, includes a memory 202 in communication with a processor 204, a communication module 206 and input/output (I/O) interfaces 208a and 208b via a bus 210. The memory 202 may contain different logical and/or physical partitions configured to cooperate with, for example, the processor 204. The memory 202 may be a hard drive, solid state drive, random access memory (RAM), read only memory (ROM) or any other known or later developed addressable storage medium. The memory 202 may be configured to store the processor-executable instructions that control and provide the functionality of the field panel 100.

The processor 204 may be a central processing unit (CPU) configured to implement the stored processor-executable instructions, program code, code modules, and applications that dictate and control the communication of data, the storage and retrieval of data, and the analysis of data organized within the memory 202. The processor 204 may include additional internal memory (not shown) to facilitate the organization and processing of data. The processor 204 may include, but is not limited to, a graphics processing unit (GPU) configured to manipulate and alter graphical data or information stored in, for example, the memory 202 to accelerate the processing of image data for output to a display (not shown).

The communication module 206 may cooperate with the memory 202 and the processor 204 to receive and transmit data between one or more devices 110, 112 and 116 operable within the control system 10. The communication module 206 may include both wired and wireless functionality. For example, the communication module 206 may be configured to communicate information and data via I/O interfaces 208a and 208b according to any number or combination of communication protocols such as the Zigbee protocol, the BACnet protocol, one or more versions of the IEEE 802.11x wireless protocols, an Ethernet and/or TCP/IP protocols and any known telephony protocol or configuration. In one embodiment, the I/O interfaces 208a and 208b may be configured to communicate information to networks or devices according to different network protocols. For example, the I/O interface 208a may connect the field panel 100 to the client portal 200 via a communication channel 224 implemented according to an Ethernet and/or TCP/IP compatible protocol; while the I/O interface 208b may connect the field panel 100 to additional field panels and addressable automation components via a communication channel 222 implemented according to BACnet protocol compatible with one or more of the networks 102, 104, 118a and 118b.

The memory 202 includes and stores a web services module 212 in communication with data exchange services 214 and a control program 216. The exemplary web services module 212 includes a webserver, a domain name service, a simple mail transfer protocol (SMTP) service and any other known or subsequent developed tools for use in communications in a networked intranet and Internet environment. The exemplary web services module 212 may be further configured to utilize the integral SMTP service to email or broadcast information and changes detected by one or more of the automation component in communication with the field panel 100. For example, if the automation component 116a detects an alarm, a change in temperature that exceeds a set-point or any other user-defined and/or BACnet event; then the control program 216 may direct the web services module 212 and the data exchange services 214 to generate and communicate a message to alert a user. Depending upon the nature of the detected event, the control program 216 may identify different users and their corresponding contact information stored within the database 220.

Data exchange services 214 may be based on a standard protocol such as, for example, the Control Systems Modeling Language (CSML) standard. CSML is independent of any specific language or technology and generic such that any automation component and control system can be described. Data exchange services 214 may be configured to facilitate communications between automation components having various functionalities and/or manufacturers that may be deployed as a part of the control system 10. The control program 216 includes the firmware, rules and instructions to direct the functionality and operational framework executed by the field panel 100. In operation, the control program 216 may be implemented by the processor 204 to govern the function of the web services module 212 and data exchange services 216 stored within the memory 202.

The memory 202 may further store a user interface or viewer application 218 and a database 220 configured in accordance with the concepts disclosed herein. In one embodiment, the user interface or viewer application 218 may be a JAVA applet, an ADOBE FLASH module, a self-executable application and/or an installable file. In another embodiment, the viewer application 218 may be an ADOBE FLASH module configured for network delivery as an executable packet or file. The viewer application 218 may be implemented as a cross platform application or tool to allow access and control via multiple client portals 200 regardless of the executed platform or operating system.

In another embodiment, the viewer application 218 may be a preloaded or stored application operable on a dedicated maintenance or configuration device. In another embodiment, the viewer application 218 may be implemented as a complete human machine interface (HMI) including, for example, analysis modules, graphical modules, trending modules, communication modules, reporting modules and any other desirable building automation functionality or features. In yet another embodiment, the viewer application 218 may be a plurality of interconnected shells and templates segregated and organized to facilitate selective editing and upgrading of individual automation components or webpages hosted by the web services module 212. The exemplary viewer applications and configurations disclosed herein gather and access information directly from each automation component or field panel identified or contained in the synchronized and updated node table. This scalable configuration allows for the easy expansion and upgrade of the building automation system while reducing the computational burden on any one automation component or field panel.

The client portal 200, including the illustrated terminal 106 and portable device 108, may include any device, smartphone or workstation configured to communicate over a network to provide access and interaction with the information and resources stored on the field device 100. In one embodiment, the terminal 106 implements according to an operating system such as Microsoft's WINDOWS XP or WINDOWS 7 including the INTERNET EXPLORER web browser and/or Apple's OS X and the SAFARI web browser. The web browser (e.g., INTERNET EXPLORER and SAFARI) may provide an interface to interact with the web services module 212 and the control program 216 to download the viewer application 218 via the communication channel 224.

In operation, a hypertext transfer protocol (HTTP) formatted query or communication 226 may be generated at the client portal 200 and transmitted over the communication channel 224 to the I/O interface 208a of the field panel 100. The control program 216 upon detection of the query 226 at the I/O interface 208a may activate a webserver portion of the web services module 212. In one embodiment, the query or communication 226 may contain an Internet Protocol (IP) address, name or other reference identifier associated with the field panel 100. The control program 216, upon receipt of the query or communication 226 establishes a connection or link between the client portal 200 and the web services module 212. The control program 216, in turn, initiates a response 228 that causes a locally stored or otherwise accessible interface tool such as the viewer application 218 to be automatically downloaded to the client portal 200 as indicated by the arrow A. Upon receipt of the response 228, the web browser operating on one or more of the devices comprising the client portal 200 executes the received viewer application 218. The downloaded viewer application 218 allows a user at the client portal 200 to monitor, analyze, adjust and otherwise control information stored in and accessible by the data exchange services 214 and database 220 utilizing CSML formatted queries and communications.

In one embodiment, the viewer application 218 may, when executed at the client portal 200, initiate communication with the database 220 to access a node table 230. The node table 230 contains the field level network addresses and designators that identify each of the automation components 110, 112 and 116 and field devices 100 operating within the control system 10. In another embodiment, the node table 230 may be in synchronous communication with any other node tables or data structures operable within other automation components 110, 112 and 116 or field panels 100 accessible via one or more of the networks 102, 104, 118a and 118b. Each automation component 110, 112 and 116 and field panel 100 may be configured to automatically communicate address and identification information upon detection of a new device operable on one of the networks 102, 104, 118a and 118b. Synchronizing and building node tables in this manner can distribute addresses and identification information distributed throughout the control system 10.

In yet another embodiment, receipt of the query or communication 226 at the I/O interface 208a can cause the control program 216 to initiate an authentication exchange. For example, a user interacting with one or more device comprising the client portal 200 may be prompted to provide a username and password upon initial connection to the web services module 212. The username and password may be utilized by the control program 216 to determine access to various portions of the control system 10. The authentication exchange may be implemented according to any known or later developed security protocol or configuration. The username and password may further control and define the extent to which data (such as, for example, the node table 230) associated with any automation component may be accessed and modified. For example, based on the username and password received, the control program 216 may restrict interaction with the information contained with the node table to read-only. In other embodiment, the control program 216 may restrict and control access based: on the type or location of the automation component; the type of information requested; and the receipt time of the query or communication 226.

Figure 3:
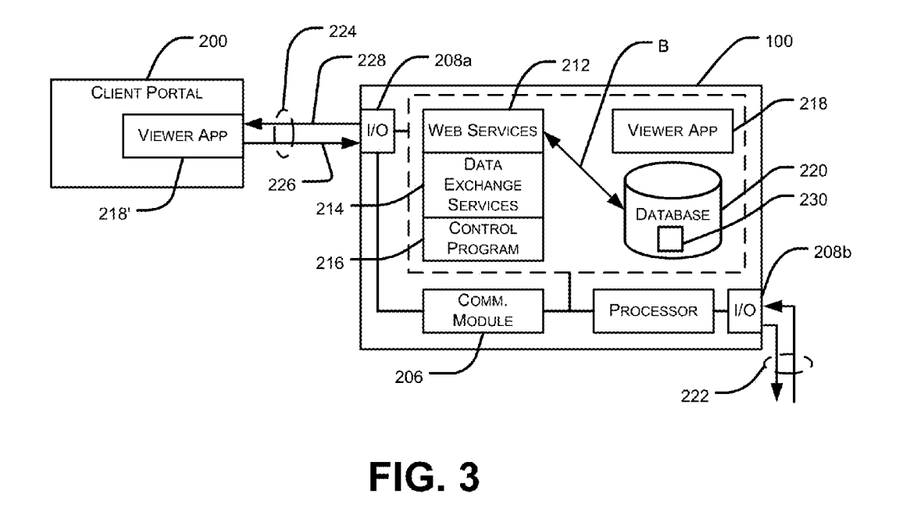
Figure 4:
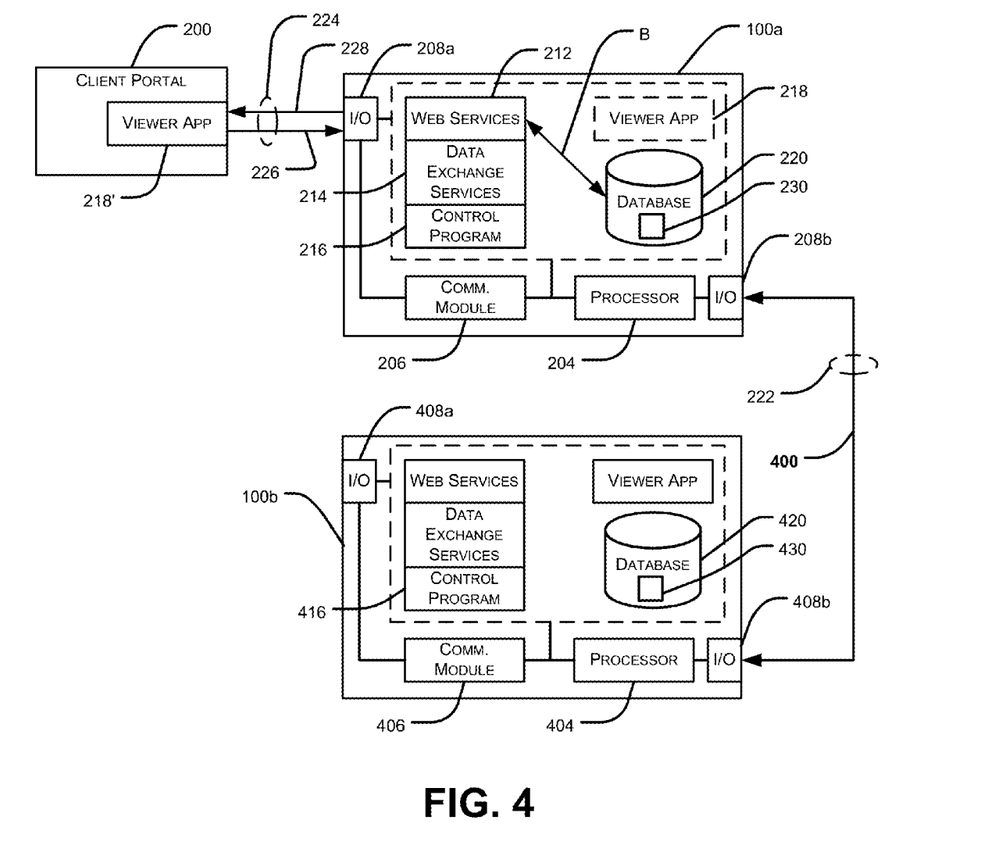
FIGS. 4 and 5 illustrate exemplary communications between a client portal and multiple field panels containing embedded webservers in accordance with the inventive concepts disclosed herein.
Figure 5:
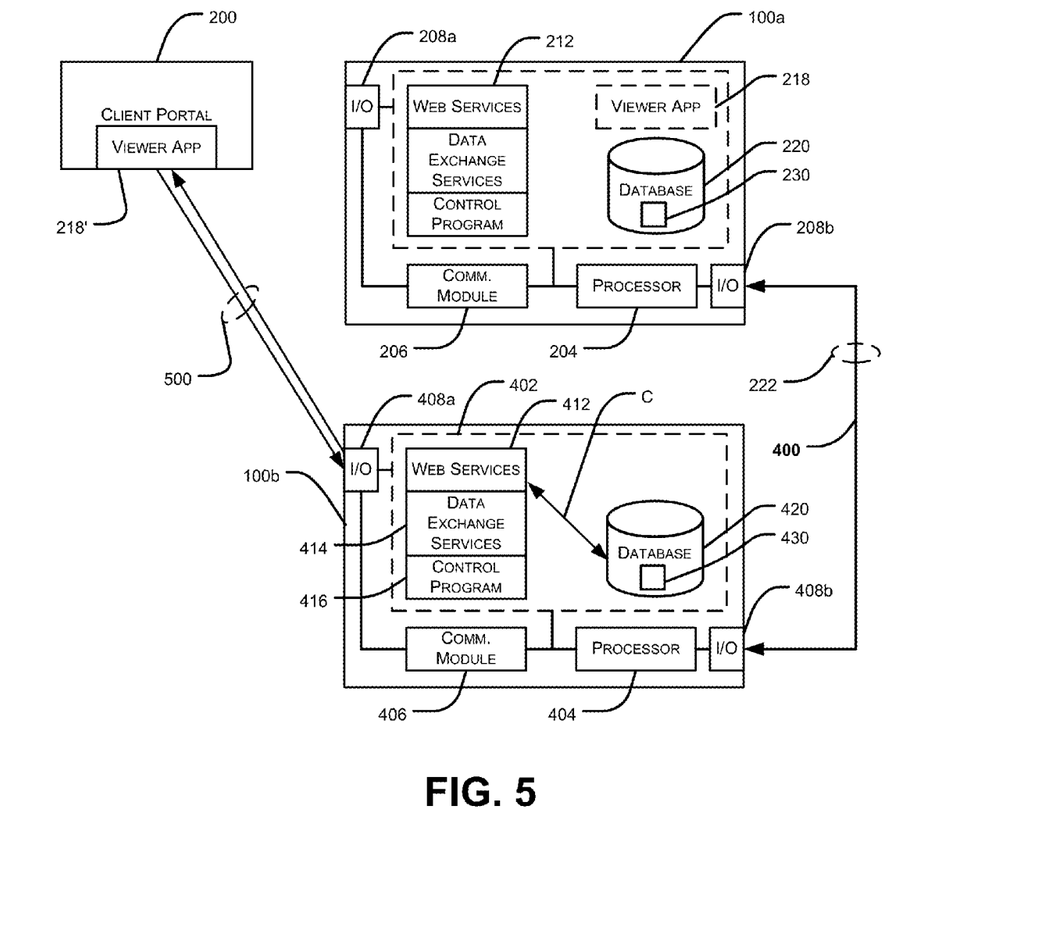

FIGS. 3 to 5 illustrate alternate single client portal and server configurations contemplated in connection with the building automation system disclosed herein. FIG. 3 illustrates the client portal 200 initiating a query or communication 226 with the field panel 100 via the I/O interface 208a and the communication module 206. The control program 216 upon detection of the query or communication 226 directs the web services module 212 to upload and transmit a copy of the viewer application 218 (identified by the reference number 218') to the client portal 200. The client portal 200, in turn, executes the received copy of the viewer application. The viewer application 218' may further provide a mechanism by which manual or automatic authentication may be implemented. For example, upon completion of a successful initial authentication via the viewer application 218', a persistent cookie or other data marker may be retained at the client portal 200. Alternatively, authentication may be required at regular intervals, that each initial login and/or to access or change protected information within the field panel 100.

In one embodiment, the viewer application 218' executes from within a web browser such as INTERNET EXPLORER as a FLASH player plug-In. By executing the viewer application as a FLASH plug-in, cross-platform interoperability can be achieved. Alternatively, or in addition to, the viewer application 218 may include one or more hypertext markup language (HTML) based webpages that may be served or hosted via the web services module 212. For example, the control program 216 may determine based on the source of the query 226, the bandwidth of the communication channel 224, the information or data requested or any other desired metric to forgo transmission of the FLASH plug-in version of the viewer application 218 to the client portal 200. The control program 216 can direct the web services module 212 to provide one or more HTML based webpages to the client portal. In another embodiment, the HTML based webpages may be utilized to request authentication information in response to the initial query 226. Upon receipt of the requisite authentication information, the control program 216 can subsequently provide a copy 218' of the viewer application 218 via the communication channel 224. In this way, secure communications can be established between the client portal 200 and the field panel 100 before allowing access (as indicated by arrow B) to the data and information stored in the database 220 and the viewer application 218.

FIG. 4 illustrates an exemplary embodiment where the client portal 200 has previously been authenticated by the control program 216 operable within the field panel 100a, and is in communication with web services module 212 via the viewer application 218'. The viewer application 218 originally stored in field panel 100 is rendered in a dashed line to indicate it has been copied and downloaded to the client portal 200. The viewer application 218', in turn, is rendered with a solid line to indicate it is contained within and executed by the client portal 200.

The database 220 is shown in synchronous communication 400 with another database 420 operable within field panel 100b. In particular, communication module 206 and processor 206 of the field panel 100a may establish a common communication channel 222 with the field panel 100b via the I/O interfaces 208b and 408b. The control program 216 may, in one embodiment, establish the synchronous communication 400 to compare and transfer information between the node table 230 and the node table 430. In this way, address information stored within the node table 430 of database 420 may be exchanged and synchronized with address information stored within the node table 230 of database 220. Alternatively, control program 216 operable within the field panel 100a may communicate a synchronization request (not shown) via the communication channel 400 to the control program 416 operable within the field panel 100b. The control program 416 may, in turn, communicate or provide the information within the node table 430 to the field panel 100a for local synchronization. In yet another embodiment, when a new automation component or field panel is placed in communication with a compatible communication network, the control program 216 may automatically commence an exchange of identity and communication information between the node tables stored within each of the devices, components and elements in communication with the communication network.

FIG. 5 illustrates the viewer application 218' operable within the client portal 200 in direct and authenticated communications with the field panel 100b shown in FIG. 4. In particular, the viewer application 218' communicates with the I/O interface 408a via a direct and authenticated communication channel 500. The communication channel 500, in turn, defines a connection between the viewer application 218' and the web services module 412. The web services module 412 in cooperation with the control program 416 and the communication module 406 may (depending upon the level of authentication) provide direct access to data and information stored within the database 420 and node table 430 as indicated by the arrow C. Examples of stored information may include: data corresponding to automation components; sensor thresholds; feedback values; alarm information; and any other information monitored and sensed by the automation components 110, 112 and 116 or other field panel 100.

In one embodiment, the field panel 100b, unlike the field panel 100a, may not host or store a copy of the viewer application 218 in order to preserve space within the memory 402. In this configuration, the client portal 200 may utilize the viewer application 218 downloaded from the field panel 100a and the synchronized address information stored in the node table 230 provided during the authentication and/or initialization process (see FIG. 4) in order to directly access the field panel 100b via the I/O interface 408a and the web services module 412. In this way, the communication channel 500 provides a means of direct access (i.e., bypassing field panel 100a) to the field panel 100b to eliminate unnecessary communications and processing at the field panel 100a. Direct access and communications provides for a robust communications topography that reduces the potential for communications bottlenecks and single points of failure. Direct access and communications further provides the client portal 200 and the viewer application 218' executing thereon with real-time or near real-time access to information stored and/or formatted by the data exchange services 414 and database 420. By communicating the stored information to the viewer application 218' for processing and/or manipulation, intensive computing resources available at the client portal 200 may be brought to bear.

Figure 6:
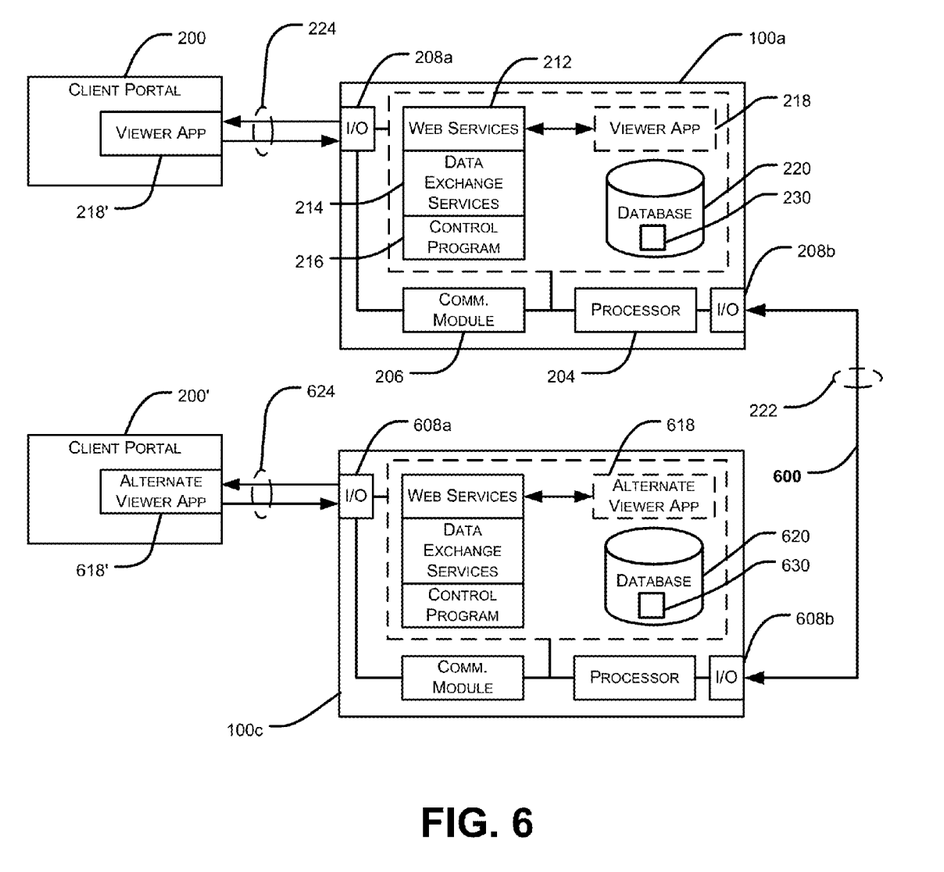
FIGS. 6 and 7 illustrate exemplary communications between multiple client portals and multiple field panels containing embedded webservers in accordance with the inventive concepts disclosed herein.
Figure 7:
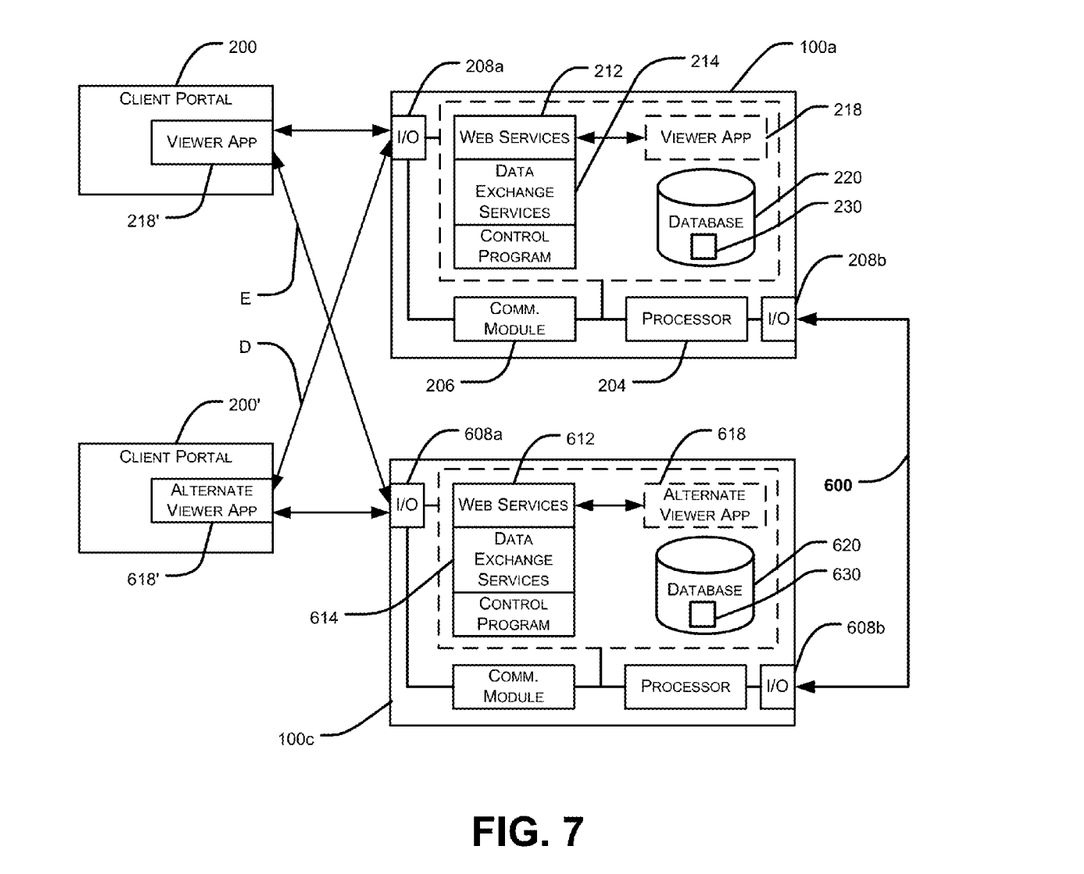

FIGS. 6 and 7 illustrate multiple viewer and multiple server configurations that may be implemented in an exemplary embodiment of the disclosure provided herein. FIG. 6 illustrates the client portal 200 in authenticated communication with the field panel 100a. In this exemplary embodiment, the client portal 200 may implement the viewer application 218' downloaded from the field panel 100a via the communication channel 224. In this embodiment, the viewer application 218' may have been downloaded and installed during a previous communication session with the field panel 100a or may have been transferred via another storage medium in communication with the client portal 200.

The illustrated embodiment further includes a second client portal 200' in authenticated communication with the field panel 100c via the communication channel 624. The second client portal 200' may implement an alternate viewer application 618' copied and downloaded based on the alternate viewer application 618 stored within the field panel 100c. The alternate viewer application 618' may be a user interface optimized for implementation on a portable device such as a smartphone. In another embodiment, the alternate viewer application 618' may be programmed as an operating system specific user interface capable of executing independently from a web browser.

In the present example, the node table 230 of database 220 may be in synchronous communication 600 via the I/O interfaces 208b and 608b with a node table 630 stored within a database 620 of the field panel 100c.

Regardless of the viewer application or client portal, as shown in FIG. 7, the address and identification information contained or stored within the synchronized and updated node tables 230 and 630 allow client portals 200 and 200' to directly access any of the field panels and automation components identified therein. As illustrated in FIG. 7, address information contained and received from the updated and synchronized node table stored in the database 630 may be utilized by the alternate viewer application 618' to directly contact the I/O interface 208a and access (as indicated by the arrow D) the web services module 212 and data exchange services 214 operable within the field panel 100. Similarly, address information contained and received from the updated and synchronized node table 230 stored in the database 220 may be utilized by the viewer application 218' to directly contact the I/O interface 608a and access (as indicated by the arrow E) the web services 612 and data exchange services 614 operable within the field panel 100c.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A building automation system comprising:
a client portal in communication with a network;
a first field panel in communication with the network and the client portal, the first field panel comprising:
a first webserver; and
a first node table, wherein the first node table contains address information related to a configuration of the first field panel;
a second field panel in communication with the first field panel, the second field panel including a second node table in communication with the first node table, wherein the second node table contains address information related to a configuration of the second field panel;
wherein the first and second node tables are synchronized to generate an updated node table based on received address information from the second node table and address information from the first node table and wherein, in response to a communication request originating at the client portal, the updated node table is provided to the client portal by the first webserver, and
wherein the first field panel automatically updates address information of the first node table related to the configuration of the second field panel as the network detects the second field panel.

2. The building automation system of claim 1, wherein the network is selected from the group consisting of: a wired network, a wireless network, a Zigbee network, a BACnet network, an 802.11x network, an Ethernet network, and a telephony network.

3. The building automation system of claim 1, wherein the client portal includes a device configured to access webserver operable within the first field panel utilizing a browser interface.

4. The building automation system of claim 3, wherein the device is configured to receive a viewer application in response to the communication request provided to the first field panel.

5. The building automation system of claim 1, wherein the first field panel is configured to automatically communicate the address information related to the configuration of the first field panel to the second field panel in response to the detection of the second field panel in communication with the network.

6. The building automation system of claim 1, wherein the first field panel automatically updates the address information of the first node table related to the configuration of the second field panel only when the second field panel is new to the network.

7. The building automation system of claim 1, wherein the automatic update of the address information of the first node table related to the configuration of the second field panel comprises addition of the address information related to the configuration of the second field panel when the second field panel is a new device in communication with the network.

8. The building automation system of claim 4, wherein the device is further configured to: receive the updated node table in response to the communication request provided to the first field panel, wherein the updated node table is communicated to the viewer application for presentation at the device.

9. The building automation system of claim 8, wherein the device communicates a second communication request directly to the second field panel based on address information from the updated node table.

10. A method for communicating with one or more field panels operable within a building automation system, the method comprising:
receiving a communications request at a first field panel storing a first node table, the first field panel being in communication with a network, wherein the communications request originates at a client portal;
communicating, in response to the received communications request, a viewer application to the user terminal for implementation thereon;
synchronizing the first node table to a second node table stored in a second field panel in communication with the first field panel, the synchronizing comprising automatically updating address information of the first node table related to a configuration of the second field panel as the network detects the second field panel, wherein the synchronized first and second node table defines an updated node table;
communicating, in response to the received communication request, the updated node table to the viewer application; and
receiving a second communication request at the second field panel from based on address information contained within the updated node table.

11. The method of claim 10, wherein each of the first, second and updated node tables includes automation component parameters associated with each of a plurality of automation components in communication with the respective field panels.

12. The method of claim 10, wherein the viewer application is configured for execution by a web browser.

13. The method of claim 10, wherein the viewer application is selected from the group consisting of: a browser executable plug-in, a standalone application and a hypertext markup language webpage.

14. The method of claim 10 further comprising: authenticating the received communications request at the first field panel.

15. The method of claim 10, wherein the communications request is an address corresponding to the first field panel.

16. A building automation system comprising:
a network;
a viewer application implemented on a client portal in communication with the network;
a first field panel in communication with the network, wherein the first field panel includes a first webserver and a first node table, and wherein the first field panel is configured to receive a communication request originating from the viewer application; and
a second field panel in communication with the first field panel via the network, wherein the second field panel includes a second node table in communication with the first node table;
wherein the first node table synchronizes with the second node table to update both node tables,
wherein the updated node tables contain address information from the first node table and the second node table prior to synchronization and wherein the synchronized first node table is provided to the viewer application by the first webserver, and
wherein the first field panel automatically updates address information of the first node table related to a configuration of an automation component as the network detects the automation component.

17. The building automation system of claim 16, wherein the communications network is selected from the group consisting of: a wired network, a wireless network, a Zigbee network, a BACnet network, an 802.11x network, an Ethernet network, and a telephony network.

18. The building automation system of claim 16, wherein the first node table is configured to automatically update stored address information in response to the received communication request.

19. The building automation system of claim 16, wherein the viewer application is stored in the first field panel and delivered to the client portal in response to the communications request.

20. The building automation system of claim 16, wherein the viewer application is executable on a web browser implemented by the client portal.

21. The building automation system of claim 16, wherein the second field panel further comprises a second webserver and wherein the second webserver is configured to receive a second communication request directly from the client portal based on the synchronized first node table.

* * * * *